(12) United States Patent
Sprout et al.

(10) Patent No.: US 6,409,599 B1
(45) Date of Patent: Jun. 25, 2002

(54) INTERACTIVE VIRTUAL REALITY PERFORMANCE THEATER ENTERTAINMENT SYSTEM

(75) Inventors: Randy T. Sprout; Susan M. Sprout, both of Wildwood, MO (US)

(73) Assignee: Ham on Rye Technologies, Inc., Wildwood, MO (US)

( * ) Notice: Subject to any disclaimer, the term of this patent is extended or adjusted under 35 U.S.C. 154(b) by 0 days.

(21) Appl. No.: 09/617,388

(22) Filed: Jul. 17, 2000

Related U.S. Application Data

(60) Provisional application No. 60/144,492, filed on Jul. 19, 1999.

(51) Int. Cl.7 .................................................. A63F 13/00
(52) U.S. Cl. .............................. 463/31; 463/42; 463/32
(58) Field of Search .......................... 463/30–33, 40–42; 348/13–15

(56) References Cited

U.S. PATENT DOCUMENTS

| | | | |
|---|---|---|---|
| 5,388,990 A | | 2/1995 | Beckman |
| 5,490,784 A | | 2/1996 | Carmein |
| 5,663,517 A | | 9/1997 | Oppenheim |
| 5,679,075 A | * | 10/1997 | Forrest et al. ................. 463/9 |
| 5,682,196 A | | 10/1997 | Freeman |
| 5,695,406 A | | 12/1997 | Park |
| 5,728,960 A | | 3/1998 | Sitrick |
| 5,734,795 A | | 3/1998 | Rogers |
| 5,737,505 A | | 4/1998 | Shaw et al. |
| 5,795,228 A | | 8/1998 | Trumbull et al. |
| 5,830,065 A | | 11/1998 | Sitrick |
| 5,846,134 A | | 12/1998 | Latypov |
| 5,850,352 A | * | 12/1998 | Moezzi et al. ............... 364/514 |
| 5,916,024 A | * | 6/1999 | Van Kohorn ................. 463/40 |
| 5,923,337 A | * | 7/1999 | Yamamoto .................... 345/473 |
| 6,056,640 A | * | 5/2000 | Schaaij ........................... 463/4 |
| 6,130,898 A | * | 10/2000 | Kostreski et al. ........... 370/522 |
| 6,154,723 A | * | 11/2000 | Cox et al. .................... 704/240 |
| 6,155,927 A | * | 12/2000 | Levasseur .................... 463/42 |
| 6,159,100 A | * | 12/2000 | Smith ........................... 463/42 |
| 6,183,364 B1 | * | 2/2001 | Trovato ........................ 463/32 |
| 6,227,974 B1 | * | 5/2001 | Eilat et al. .................... 463/40 |
| 6,257,982 B1 | * | 7/2001 | Rider et al. ................... 463/31 |

* cited by examiner

Primary Examiner—Jessica Harrison
Assistant Examiner—John M Hotaling, II
(74) Attorney, Agent, or Firm—Greensfelder, Hemker & Gale, P.C.; Peter S. Gilster

(57) ABSTRACT

The present invention relates to a novel interactive virtual reality (VR) performance theater and environment in which a plurality of participants enjoy an entertainment and/or educational experience. The performance is viewed by the participants through VR display devices such as a head mounted display, wherein both an immersive graphical environment and live and/or pre-recorded performers are viewed. The participants exert limited control over the content and outcome of the performance through the use of input devices, such as hand held input devices having a plurality of buttons, and/or voice communications, while viewing the live or pre-recorded performers whom are mixed within the immersive VR environment. The system uses interconnected computers, video and audio processing devices, and furthermore includes a network interconnecting the computers, participants, and live/pre-recorded performers for video, audio, and graphics transmission.

9 Claims, 11 Drawing Sheets

INTERACTIVE VIRTUAL REALITY PERFORMANCE THEATER ENTERTAINMENT SYSTEM

CROSS-REFERENCE TO RELATED APPLICATIONS

This application is based upon Provisional Patent Application entitled Interactive Virtual Reality Performance Theater Entertainment System, Serial. No.: 60/144,492, Filed Jul. 19, 1999, the contents of which are incorporated herein by reference in their entirety; and continued preservation of which is requested.

BACKGROUND OF THE INVENTION

1. Field of the Invention

The present invention relates to the field of electronic video and live performance entertainment. More specifically, the present invention relates to entertainment and educational systems whereby participants interact with an electronic or computerized environment in addition to live and/or pre-recorded performers. Even more specifically, the present invention relates to immersive virtual reality computer systems in which participants interact with a virtual reality environment and live performers using a variety of immersion and input devices such as a head mounted display and a handheld keypad.

2. Description of the Related Art

Virtual reality entertainment systems utilizing head mounted displays or other immersive devices or methods, whereby a participant views and interacts with a software-generated virtual reality environment have been used for training and entertainment purposes for many years. An immersive virtual reality environment as used and described herein refers to a computer generated graphical environment wherein a participant is "immersed" within the environment so as to provide to the user a sensation of being physically located within the graphical environment, although the participant is only electronically present with other objects within the environment. Therefore, an immersive virtual reality environment creates an illusion to the participant that he or she is in an artificially created environment through the use of three-dimensional (3D) graphics and computer software which imitates the relationship between the participant and the surrounding environment.

Traditionally, participants are represented in the software environment by projections of figures referred to in the art as avatars. Participants control their avatars through a combination of input mechanisms including, but not limited to, hand held input devices and data generated from electronic and electromagnetic tracking devices which monitor bodily movement. Objects within the virtual reality environment which are not controlled by the motion of the participants are generally controlled by a computer software program and can also respond to the input of the participants.

In related art virtual reality environments, figures or objects not controlled by participants move autonomously only in accordance with the software program and respond to the input devices of each participant (Carmein U.S. Pat. No. 5,490,784, Latypov U.S. Pat. No. 5,846,134). Passive and active objects such as trees and animals move in a predetermined manner within the virtual reality environment. Furthermore, the participant has the opportunity to interact with such objects in the virtual reality environment, however, the objects are limited to computer generated images.

Generally, the object or focus of virtual reality environments is traditionally on the participants' interaction with objects generated entirely by the computer graphics program that do not represent, or are not substantially controlled by, a human participant in the simulation. Also traditionally, groups of participants have been entertained by graphically enhanced live or pre-recorded performers on stage or through television, cinema or other non-immersion mediums without the enhancements of immersion devices or methods, and furthermore without immersion devices or methods in combination with voice communication from the participants to the performer and amongst and between participants. (Trumbull et al. U.S. Pat. No. 5,795,228).

Other known entertainment systems, such as that which is disclosed in Freeman et al. U.S. Pat. No. 5,682,196, include the capacity for two-way communications between a computer-controlled host and a participant. These systems, however, do not possess the capability for voice communication amongst and between participants, or between participants and a live host. The system in Trumbull allows for one-way audio communication from the live performer to the participants but does not provide for audio communication from the participants to the live performer. Nor does the system of Trumbull allow for audio communication amongst and between the participants, furthermore enhanced by an immersive virtual reality environment.

Several known art virtual reality systems have developed an elementary tactile interface. For example, Shaw et al U.S. Pat. No. 5,737,505 discloses an interface resembling an upper torso suit of armor which detects limb and body position. The device can provide force feedback or impart motion to a participant who is engaging in both active and passive communications with the virtual reality environment. The virtual reality system of Shaw, however, does not provide communication amongst and between participants, nor does the system include live and/or pre-recorded performers.

The known art entertainment systems, therefore, lack certain advantageous features. In traditional systems, the participant may be interacting with a host and the environment using some input device. The host, however, is seldom live and is instead pre-recorded or computer-controlled, therefore reducing the spontaneity of any interaction with the participant. The host in Trumbull can be a live performer, but the system itself is not within a virtual reality environment and therefore lacks the immersive effects which are imparted upon the participants for a more exciting experience. Further, there is no voice communication from the participants to the performer, nor is there voice communication amongst and between participants in Trumbull, thereby further limiting the entertainment or educational experience.

Accordingly, there appears a need in the art for a virtual reality based entertainment and/or educational system which provides three-way immersive interactive communication amongst and between: 1). participants; 2). an immersive environment; and 3). live and/or pre-recorded performers. Further, there appears a need for a system which includes provisions for individual and/or mixed video, audio, and graphical inputs and outputs to enhance the overall entertainment and/or educational experience. Additionally, there is a need for the content and outcome of the experience to be controlled, at least in part, by the inputs of the participants in response to scripted and/or impromptu communications from the performers and/or the virtual reality environment. Finally, there appears to be a need for a system which is robust and modular in design such that a plurality of participants, performers, and virtual reality environment inputs and outputs can be easily retrofitted depending on the desired application and to accommodate the rapid changes of computer technology. The synergistic combination of these elements can provide a hitherto-unrealized level of entertainment and/or educational excitement and quality for an audience of participants.

SUMMARY OF THE INVENTION

According to the present Virtual Reality Performance Theater, (VRPT), the inventors change the focus of the software program and entertainment or educational performance from the interaction between individual participants and computer generated graphical objects within a virtual reality environment to a three-way interactive communication between participants, live and/or pre-recorded performers, and an immersive virtual reality environment. The inclusion of three-way communication amongst and between participants, live and/or pre-recorded performers, and an immersive virtual reality environment results in a synergistic effect which creates an unparalleled entertainment and/or educational experience.

The primary object of the present invention, therefore, is to provide an interactive virtual reality performance theater wherein there exists three-way communication amongst and between participants(), live and/or pre-recorded performer(s), and the virtual reality environment. The three-way communication includes, but is not limited to, audio, video, and graphical input and output data. Importantly, the interaction of the participants and performers with each other and the virtual reality environment determines, to some extent, both the content and the ultimate outcome of the performance.

Accordingly, a further object of the present invention is to create an interactive virtual reality environment in which a plurality of participants enjoy immersion in a software-generated simulation combined with live and/or pre-recorded performances.

A further object of the present invention is to allow the participants to exert control over the content and outcome of the performance.

Another object of the present invention is to provide for a novel immersive performance in which each participant and the plurality of performers are linked together for voice communication with a voice intercom system. The system should allow participants to establish a constant dialogue, enhancing interactivity by allowing them to share opinions and work together in an entertainment game or educational setting.

Yet another object of the present invention is to provide a virtual reality environment which is easily customizable to the requirements of a specific application and which can be easily upgraded to comport with the rapid pace of computer technology.

In brief summary, the present invention overcomes and substantially alleviates the deficiencies in the prior art by providing an interactive virtual reality performance platform and environment in which participants can interact with each other, with live and/or pre-recorded performers, and with an immersive virtual reality environment for a highly enjoyable entertainment and/or educational experience. Importantly, participants can exert limited control over the content and outcome of the performance through input devices and voice communication.

The system generally utilizes input and output devices for each of the participants and the performers, and further includes control computers having system data and programs to carry out specific processing tasks. The system further includes a variety of audio and video components which mix and switch audio and video data for presentation to participants in the audience. Through the innovative mixing and switching techniques, the system is able to present to each of the participants a graphical virtual reality environment wherein live video of the performers is superimposed within the graphical environment. The participants, therefore, view and interact with a novel display of both graphical data and live video data for an exciting entertainment and/or educational experience.

In support of the video mixing and switching, the virtual reality display is accomplished through chromakey and other electronically-generated costuming wherein the video and/or audio inputs from the performer(s) is mixed with the graphical environment in which the participant is immersed, using, for example, a head mounted display (HMD). The participants, therefore, experience an immersive graphical environment in which the performer(s) can also be seen and/or heard.

The participants exert control over the content and outcome of the performance through the use of hand-held input devices such as a keypad or cyberglove, while viewing images or electronic facsimiles of the performers/performers, software simulations, and other video, audio, and graphical output of the virtual reality environment. The performer(s), by following a script and/or impromptu actions, query the audience for responses based upon, for example, a specific question asked or their opinions as to a particular subject matter. Participant responses can then dictate the further content and eventually the outcome of the performance, such as a participant being declared the "winner" based on points earned in responding to the performer(s) and/or system queries.

The system further includes additional audio and motion devices, including but not limited to, speakers and motion-equipped seats for each of the participants to enhance the immersive experience. The immersive experience of the participants is supplemented by aural and physical sensations of the motion-equipped seats, referred to hereinafter as "rumble seats," in which the individual participants sit throughout the performance. The seat contains speakers for background sound effects, and seat movement effects are generated by software in response to the participants' voice communication, decisions, and physical movement.

In addition, a network is included to connect computers for data transmission and to facilitate remote interconnectivity and participation. With implementation of the network, participants and performers can be physically present at geographically remote sites while experiencing the same virtual reality environment and performances.

Accordingly, the inventors add immersive virtual reality technology and electronic interaction to live and/or pre-recorded performances by performers. By placing the participants in a virtual reality environment, the participants and performers can interact more directly while sensing a physical proximity to each other and the immersive virtual reality environment.

An immersive environment, as more fully described herein below, is defined as one in which a greater than 25 degree diagonal field of view is provided no more than 10 feet from the viewer. To achieve an immersive environment, the VRPT can utilize a head mounted display (HMD) device that creates the sensation of immersion in a 3D graphical environment. In addition, specific proximity to a non-head mounted display, such as a monitor at eye level, can create a similar immersive environment. Additional immersion devices and methods are more fully described herein below.

As a result, the entire system can be classified as a blend or meld of virtual reality, computer graphics, and teleconferencing technology. The performers need not be at the local site or sites where the participants are located. Rather, the performers may be located as remotely as communication channels allow and themselves may deliver their performance from different sites to a plurality of sites via the Internet, satellite transfer, or other channels.

One benefit of the present system is that a human participant can interact with other participants and the performers much more spontaneously than in previous forms of interaction. Participants can also have a far more "personal and unique" experience through the use of immersion devices and interactive communications technologies.

Another benefit of the present system is that the virtual reality performance theater can now be used as a medium for person-to-person visual projection, as well as entertainment and business applications such as stand-up comedy, dramatic presentations, teaching and lecturing, and other activities related to communication of ideas and concepts to an audience, all within an immersive simulation medium.

Further, the capacity to simultaneously include multiple performers adds to the performance a new dimension. Additional performers are added with audio only, voice only, or both audio and video together. A single performer, although effective, can only engage in monologue and such interaction with the participating audience as the system will permit. By comparison, a plurality of performers in the electronic simulation medium allows this medium to be used for live and recorded dialogue between performers and participants so that true drama may be presented.

Other objects and features will be apparent to those skilled in the art and are pointed out with more particularity herein below.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
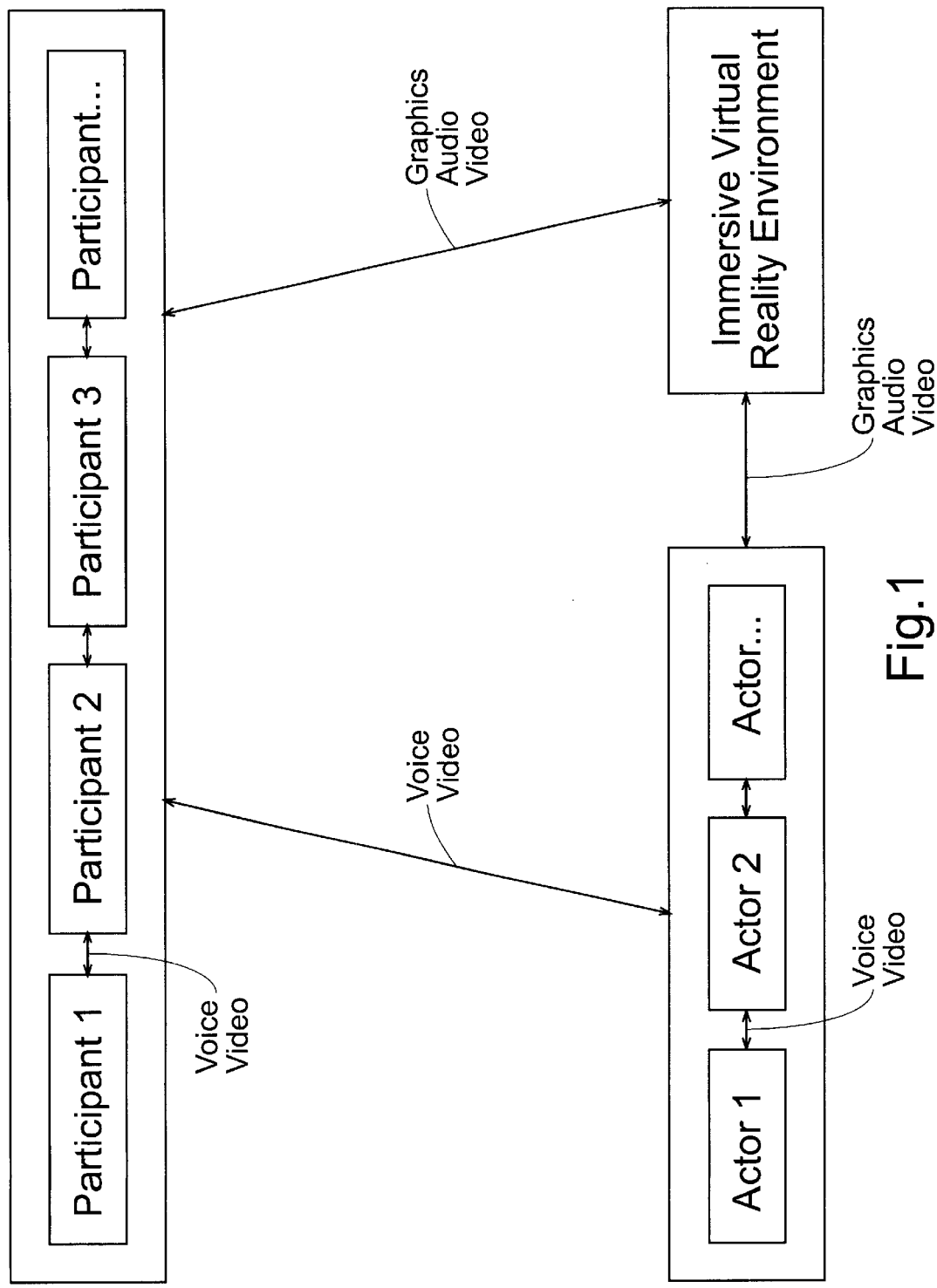
FIG. 1 is a block diagram showing the communication amongst and between the participants, the performers, and the immersive virtual reality environment.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE PRESENT INVENTION

To highlight and emphasize the novelty of the present invention, FIG. 1 shows the three-way communication amongst and between the participants, the performers, and the immersive virtual reality environment. The Virtual Reality Performance Theater (VRPT) system provides voice and video communication amongst and between participants, voice and video communication amongst and between the participants and the performers, voice and video communication amongst and between the performers, and graphic, audio, and video communication amongst and between the participants and the performers and the immersive virtual reality environment. The combination of audio/voice, video, and graphical inputs and outputs to and from each of the participants, performers, and immersive environment creates a synergistic effect which results in an unparalleled entertainment and/or educational experience for participants as described more fully herein below.

Throughout the following description, it shall be understood that singular or multiple participants and performers can be used for the virtual reality performance theater although referred to in either the singular or multiple context, unless otherwise indicated.

Figure 2:
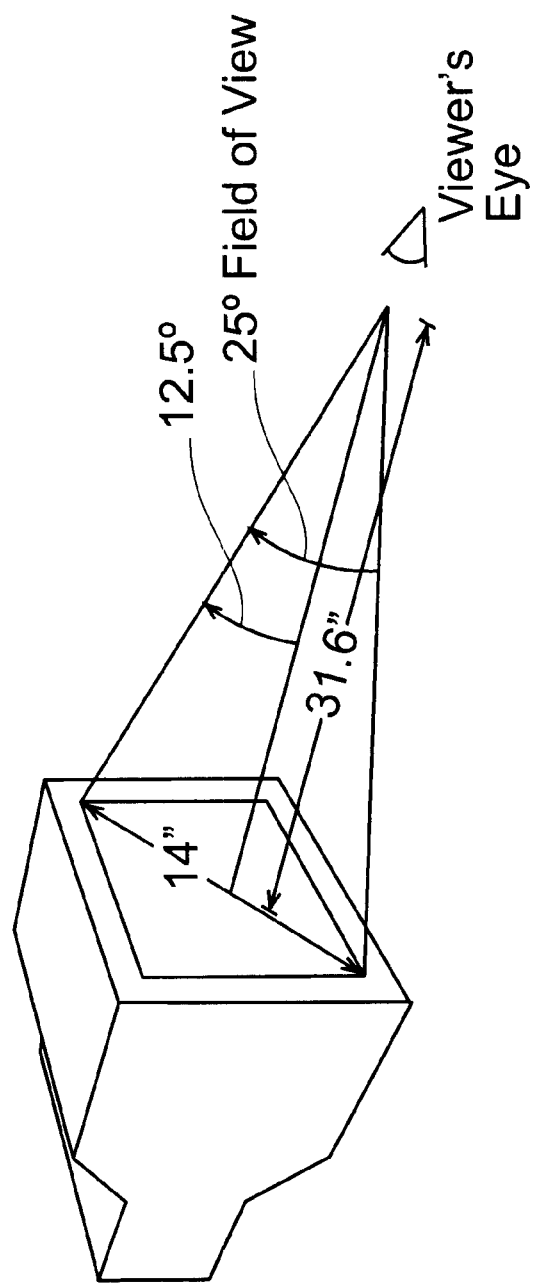
FIG. 2 is an orthogonal view of a computer display illustrating the inventor's definition of "immersive."

With regard to the following descriptions of the preferred and alternate embodiments of the present invention, the inventors define an "immersive" display as one which has greater than a 25 degree diagonal field of view with a distance of no more than 10 feet from the viewer. The 25 degree diagonal field of view from a distance of 10 feet is illustrated more clearly in FIG. 2, where a typical display of a computer terminal which has a 14 inch diagonal viewing length would require that the viewer be approximately 31.6 inches from the display in order for the display to qualify as "immersive".

Figure 3:
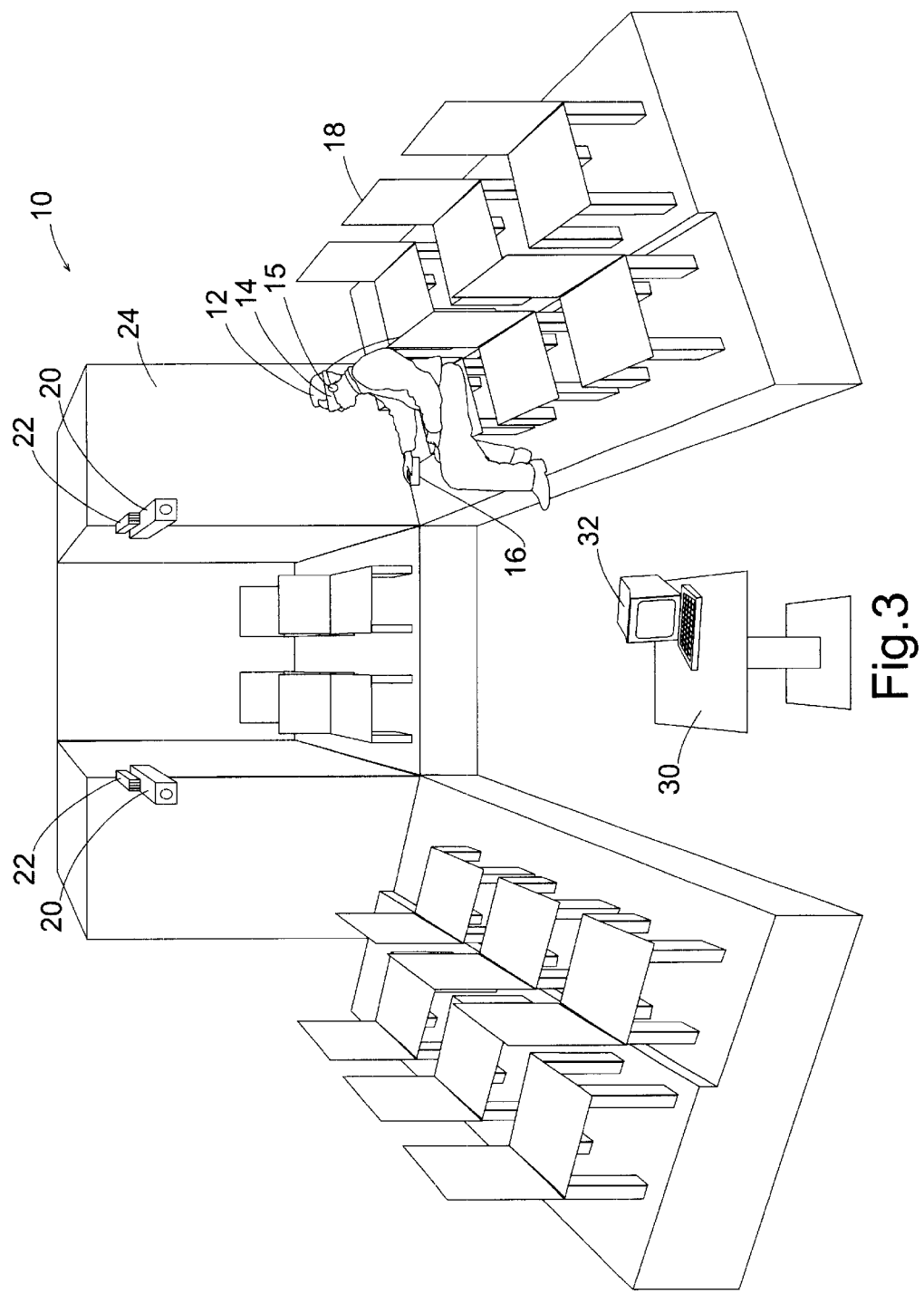
FIG. 3 is an orthogonal view of the virtual reality performance theater according to the present invention.

Referring to FIG. 3, the preferred embodiment of the present invention is illustrated and generally indicated as virtual reality performance theater 10. Virtual reality performance theater (VRPT) 10 facilitates multiple participants and generally includes for each participant head mounted display (HMD) 12, microphone 14 mounted to HMD 12, headphones 15 mounted to HMD 12, and hand-held input device 16. HMD 12 provides a visual display of the immersive environment to each of the participants through one or two cathode ray tubes (CRT), one or two liquid crystal displays (LCD), or other vision devices. The participants view the virtual reality environment through HMD 12 and provide input to the system with hand-held input device 16 and microphone 14. Further, the participants can hear voice and/or audio communications from other participants, performers, and the VRPT system with headphones 15.

Audio output from VRPT 10 to the participants is also provided through rumble seats 18, each of which is equipped with a suitable speaker system or other suitable sound transponder so that each seat may be called a "rumble seat." Rumble seats 18 further include vibration panels or other sound or movement transducers or devices which provide output to the participants which supplements the immersive experience within the virtual reality environment.

Virtual reality performance theater 10 further includes control center 30 where a live host interacts with participants and enters, for example, the name of each participant into registration computer 32 prior to seating the participants in rumble seats 18. Each participant typically passes through control center 30 and registers prior to participating in virtual reality performance theater 10.

Prior to and during the performance, the physical actions and audio inputs of the participants are captured with video cameras 20 and theater microphones 22. The video images and audio signals captured by video cameras 22 and theater microphones 22, respectively, are then communicated to a live performer or performers whom reside in presenter enclosure 24 during an entertainment and/or educational performance. The output from video cameras 20 and theater microphones 22 is also further processed by VRPT 10 as more fully described herein below.

Figure 4:
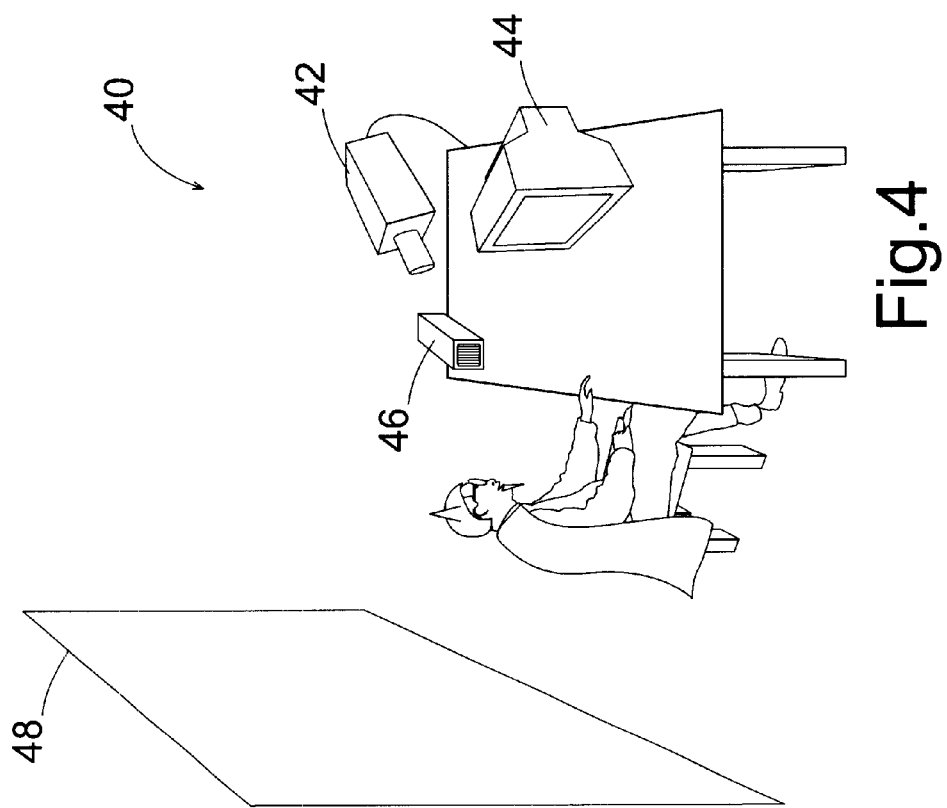
FIG. 4 is an orthogonal view of the presenter enclosure according to the present invention.

The interior of presenter enclosure 24 is more clearly shown in FIG. 4, where a live performer is shown viewing participants through video monitor 44 and listening to participants through speaker 46. The outputs of video cameras 20 and theater microphones 22 are transmitted, respectively, to video monitor 44 and to speaker 46 located within presenter enclosure 24. Presenter enclosure 24 is specifically designed to mask the existence of the live performer so that the participants are not aware of his or her physcial presence. Presenter enclosure 24 also includes stereoscopic video camera 42 to capture the live image of the performer and lighted backdrop 48 to facilitate the mixing of live video of the performer with the graphical data within VRPT 10 as more fully described in the following.

A key novel feature of the present invention includes the mixing of video input from the live performers with the graphical data or images within the virtual reality environment, which combination is then viewed by the participants through HMD 12. As shown in FIG. 4, stereoscopic video camera 42 captures the live video image of the performer and subsequently sends the corresponding video signal to the system for processing and mixing with the graphical data within the virtual reality environment.

Figure 5:
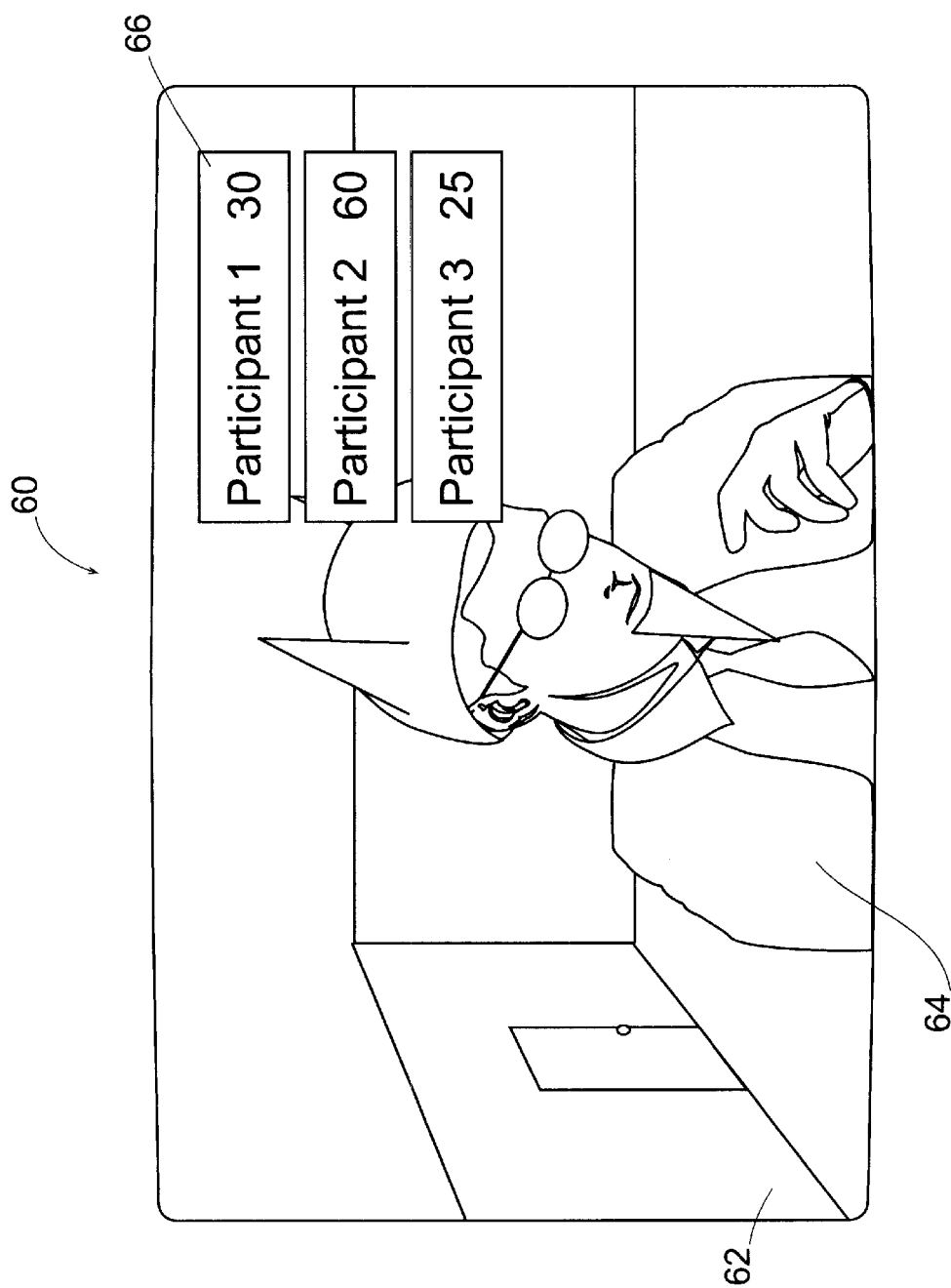
FIG. 5 is a front view of a sample video display as viewed by the participants according to the present invention.

The result is a novel virtual reality environment illustrated and generally indicated as immersive display 60 as shown in FIG. 5. The participants view not only the graphical data within the virtual reality environment, but also view live video of the performers superimposed or mixed with the graphical data in the environment. Therefore, as the participants traverse and interact with graphical environment 62, live performer video image 64 is periodically superimposed in the environment so that the participants and the performers can interact amongst and between each other using the communications devices as described herein.

The inclusion of live performer video image 64 together with graphical environment 62 within the virtual reality environment can be controlled by the computer software of virtual reality performance theater 10, as described more fully below, or by the live performers. Immersive display 60 may further include scoreboard 66 which lists the name of each participant and their respective scores throughout the performance which indicates their level of success in responding to questions posed by the live performers and/or the virtual reality environment. It shall be appreciated that other challenges to the participants involving skill, input, or luck may also be implemented. Immersive display 60 as described herein is only illustrative of the many combinations of graphical data and live video data possible and is therefore not intended to be limiting as to the content thereof.

Figure 6:
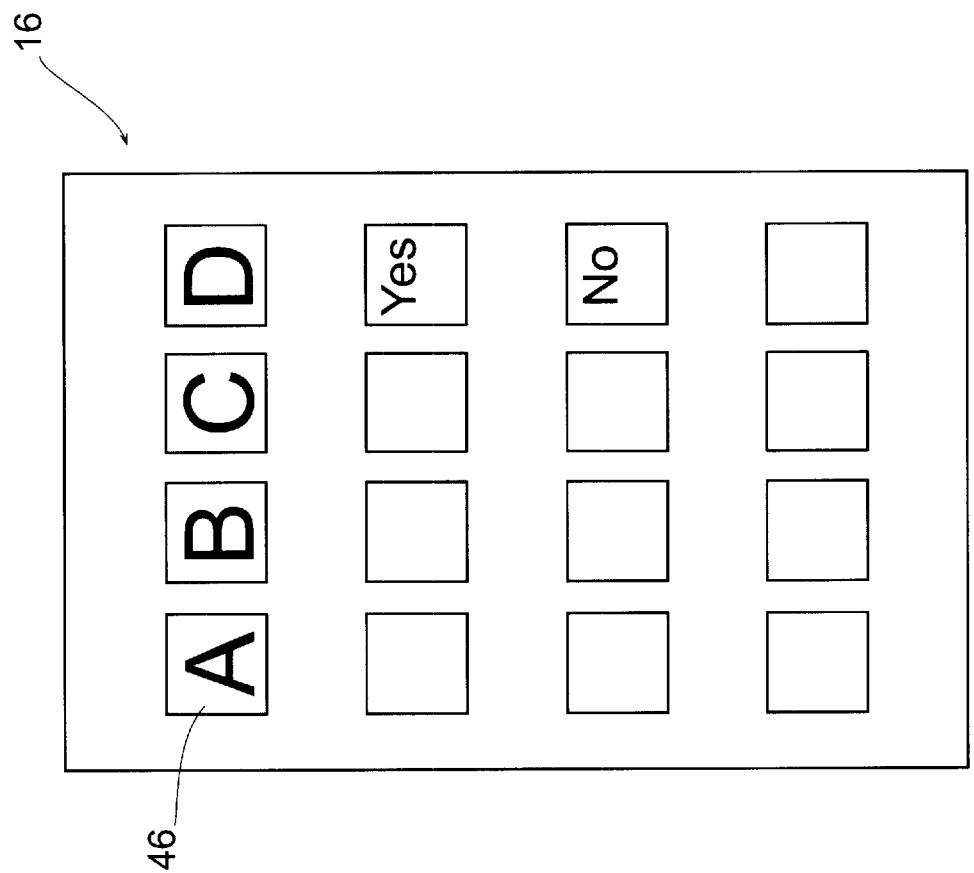
FIG. 6 is a top view of the hand-held input device keypad of the present invention according to the present invention.

As shown in more detail in FIG. 6, hand-held input device 16 is used in the preferred embodiment of the present invention to facilitate user responses. Hand-held input device 16 is shown as a keypad and includes a plurality of buttons 80 which contain labels that correspond with possible answers or inputs to questions posed by the live performers and/or the virtual reality environment. For example, multiple choice questions could be posed by the system to the participants with four possible answers, namely, A through D. The participant simply presses the button which corresponds with the correct answer and the system tabulates the results of participant input. As a further example, a simple "yes" or "no" question could be posed to the participant based on the content of the immersive environment, and the participant would then press the corresponding "yes" or "no" button located on hand-held input device 16. As another example, the participants could press buttons to signify more complex dynamic meanings or concepts, such as pressing a button which reads "TRUST" to show that they "trust" the performer and agree to take the course of action that the performer proposes. As another example, the participants could press one or more buttons as rapidly as they could, as a test of reflexes or memory, to accomplish some objective or surpass some challenge. The foregoing are only examples of how participant input devices can be used to interact with the performers and the virtual reality environment, and are not intended to limit the types of interaction which are possible with the virtual reality performance theater.

Figure 7:
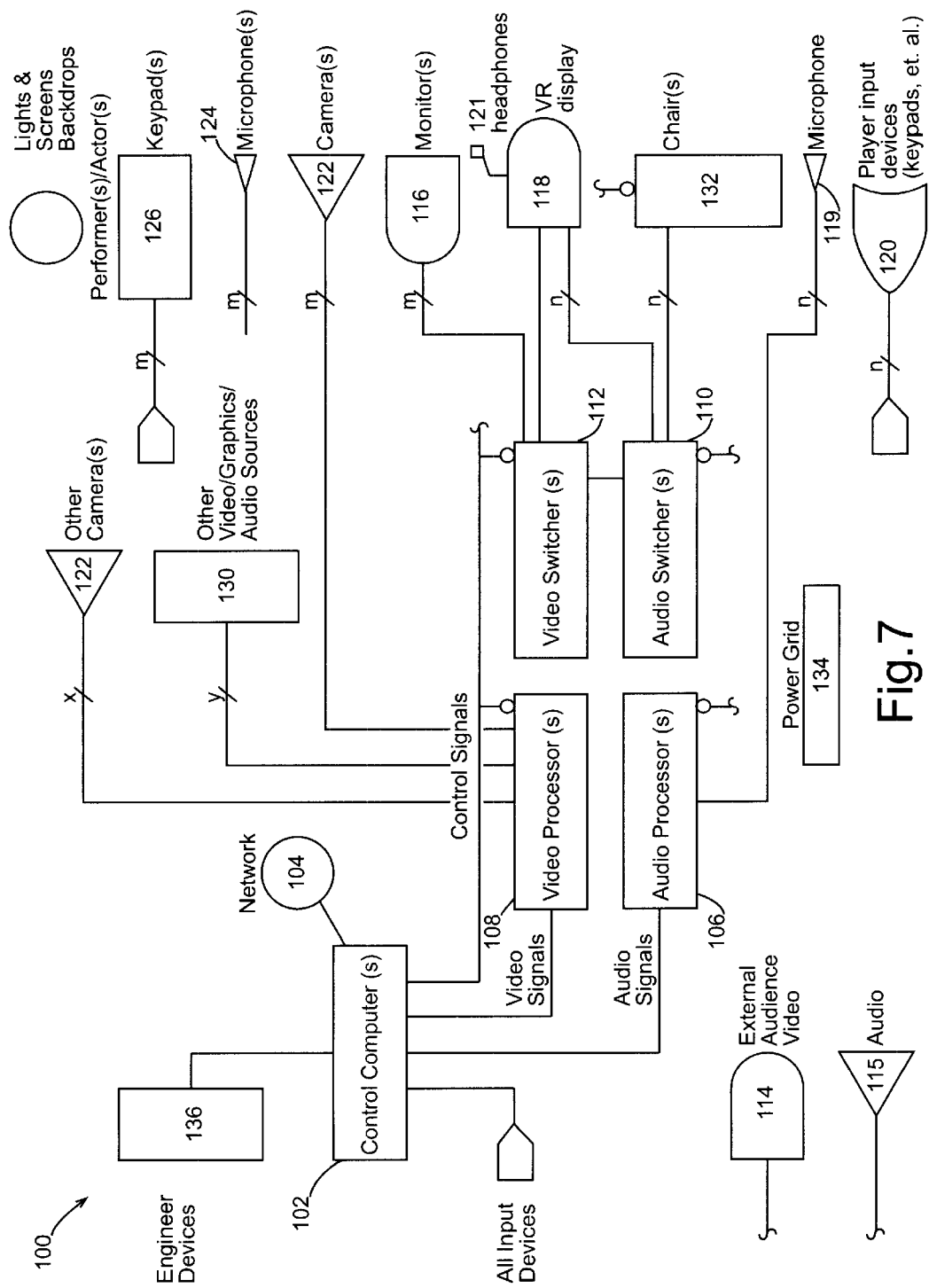
FIG. 7 is a block diagram of the system components according to the present invention.

The processing and communications of all system inputs and outputs is detailed in the system diagram as shown in FIG. 7. The computerized system of the preferred embodiment of the present invention is illustrated and generally indicated as virtual reality performance theater system 100. Control computers 102 are connected via network 104 together with audio processors 106, video processors 108, audio switches 110, video switches 112, external audience video 114, external audience audio 115, live performer video monitor 116, and VR display 118. Each of the external audience video 114, live performer video monitor 116, and VR display 118 project a perspective viewpoint visual display of the software-controlled virtual environment and performance of virtual reality performance theater system 100. VR display 118 further includes headphones 121 which deliver audio data to the participants. Control computers 102, audio processors 106, video processors 108, audio switches 110, and video switches 112 process a variety of pre-programmed data within the software in addition to inputs from participants, performers, and the immersive environment of virtual reality performance theater system 100.

The inputs for virtual reality performance theater system 100 include participant microphones 119, participant input devices 120, (such as hand-held input device 16 and as previously discussed and illustrated in FIG. 3), live performer cameras 122, live performer microphones 124, live performer keypads 126, auxiliary video cameras 128, and auxiliary video, graphics, and audio sources 130. Additional system components of virtual reality performance theater system 100 include chairs 132, power grid 134, and engineer devices 134. Chairs 132 represent the plurality of rumble seats 18 as previously described above in connection with FIG. 3. Power grid 134 supplies the required amount of power to each of the devices which require power within virtual reality performance theater system 100. Engineer devices 134 are electronic components which are monitored and adjusted by an "engineer" or "system operator" separate from the performer or host (the person who enters participant information into registration computer, takes money, seats participants, gives the intro, etc.). Engineer devices 134 control volume levels, special effects, or other elements of the performance.

Audio processors 106 and audio switches 110 are connected to each of network 104, live performer microphones 124, and participant microphones 119. Audio processors 106 and audio switches 110 are controlled by control computers 102 and therefore distribute audio signals accordingly throughout the system.

Microphones 119 enable voice communication capability with small microphones built into the HMD. Microphone voice signals are mixed together using audio mixing components as will be described more fully in the following. The voice signals are then further mixed with other performer voices, music, special audio effects, and other live and pre-recorded audio signals generated by the software.

The system uses small condenser microphones mounted inside the HMD, and all participants have a unique microphone that senses their voice. High speed Internet audio transmission, for example, can be used in an Internet embodiment of the VRPT system, as more fully described in the following, with voices mixed together at the host site using a software program.

In an alternate embodiment of the present invention, a capability is provided to switch certain participant microphones on and off, or control volume levels automatically, in order to enhance team play or filter out participants who choose to use undesirable language or interfere with the live performance. Microphone switching can be accomplished through either computer-controlled or manual switching.

Headphones 121 may be replaced or augmented with other audio delivery devices which are not attached to the HMDs. Additional audio devices may include desktop speakers, wall-mounted speakers, or other types of audio-generating devices.

Video processors 108 and video switchers 112 are employed in the VRPT to deliver a wide variety of graphics to the participants. Multiple functions of the mixer are used to provide graphics effects, such as chromakeying of various sources. The live performer or performers are positioned in front of, for example, a lit blue screen and are chromakeyed over the graphics from any other source, including the primary or secondary computers, or other performers or other camera input sources. In the system of the invention, a group of participants can interact with the performers inside the virtual reality environment and can enjoy a sense of "immersion" within the environment so created.

Player input devices 120 include a hand-held input device as previously set forth. Participants press buttons on keypads in response to specific game dynamics to answer questions, vote, solve problems, or respond to reflex challenges as previously described.

Alternate embodiments of the present invention may include other player input devices 120 which communicate with the virtual reality environment. Alternate embodiments for player input devices 120 include other types of player input devices, such as a keyboard, joystick, steering wheel, cyberglove, flying mouse, desktop mouse, trackball or pad, which communicate with the computer through a variety of hardware and software means.

In the preferred embodiment of the present invention, network 104 uses a Windows operating system with TCP/IP communications protocol, and operates on a 100 base-T network with a multiport hub and 3Com 905BTX network cards. Alternate embodiments can use active/passive, or switching/non-switching hubs, as well as other network cards (Linksys or others), other communications protocols (such as NetBEUI or IPX), and other operating systems (such as Windows 95, 98, 2000, NT, OS/2, or Macintosh). In the preferred embodiment, network software from Microsoft is used and is client-to-client or client-to-server based. Alternate embodiments can include FTP, Banyan, Sunsoft, or Novell networking software.

The preferred embodiment of the remote system uses four network machines for control computers 102. The four machines include a main server, secondary and tertiary computers which play audio, video, and other functions, and a registration computer, (illustrated as 32 in FIG. 3 above), that is used for name input and other information. Control computers 102 communicate using TCP/IP protocols and file and drive sharing. Alternate embodiments of the invention may use fewer or greater numbers of networked computers, including the dedication of one computer to each participant to provide individual and unique graphics to that participant.

The devices employed for VR displays 118 include, for example, an HMD referred to as "i-glasses" model LC manufactured by i-O Display Systems which uses two LCD devices that deliver stereoscopic visuals with approximately a 30 degree field of view and 320×240 pixel resolution. Other types of HMDs may be used to achieve the immersive effect for alternate embodiments of the invention, such as those which use LCD displays, CRT displays, projection displays, and other technologies. Stereoscopic graphics, herein defined as a unique graphical perspective delivered to each eye, is not essential. Monoscopic graphics, in which the same image delivered to both eyes, can achieve nearly the same effect for purposes of the present invention.

Additional VR displays 118 besides HMDs may be used in alternative embodiments, such as CRT or LCD monitors. The monitors are positioned in front of the participant with a field of view of at least 25 degrees, or a large-screen projector positioned within 10 feet of the participant with at least a 25-degree field of view. By the "immersive" parameters as previously set forth above and described in relation with FIG. 2, a typical desktop computer monitor having an approximate 14 inch diagonal field of view, viewed from a typical distance of 31.6 inches, would qualify as an immersion device.

The hand-held input device for the preferred embodiment of the present invention is a 17 or 18-key numeric keypad such as model 623 or 633 manufactured by Genovation Systems. However, numerous other numeric keypads exist from other manufacturers which could be employed in the VRPT of the present invention. The keypad, or other participant input device, communicates with the control computers 102 through serial RS-232 communications protocol and attach to a multi-port RS-232 device mounted on the ISA or PCI system bus. The multi-port device is manufactured by Willies Computer Software and governs COM ports in the Windows Environment. Custom device driver software reads the ports and communicates the player information to the game software.

Alternate embodiments of the present invention may include other player input devices 120 which communicate with serial keypads or input devices, or which operate on other protocols entirely, such as USB, parallel, wireless, or direct-wire.

Microphones 119 receive power and send signals to an amplifier/mixer composed of components such as Biamp Systems' models Advantage One, Advantage EX, 801, 601e, and 301e. Alternative embodiments may use other brands of amplifier/mixer equipment, or may utilize desktop microphones or other individual microphones. The signals may be mixed together with a variety of hardware or software solutions, or combinations of the two.

The preferred embodiment of the present invention uses a Panasonic MX-50 video mixer. The system also uses other chromakey and switching functions of the mixer, controlled by the main or secondary computer via RS-232 communications. The VRPT uses a Burst video switcher to direct a variety of signals to the Panasonic Mixer. Alternate embodiments of the invention may utilize different mixing or switching technologies, implemented either in hardware or software.

Figure 8:
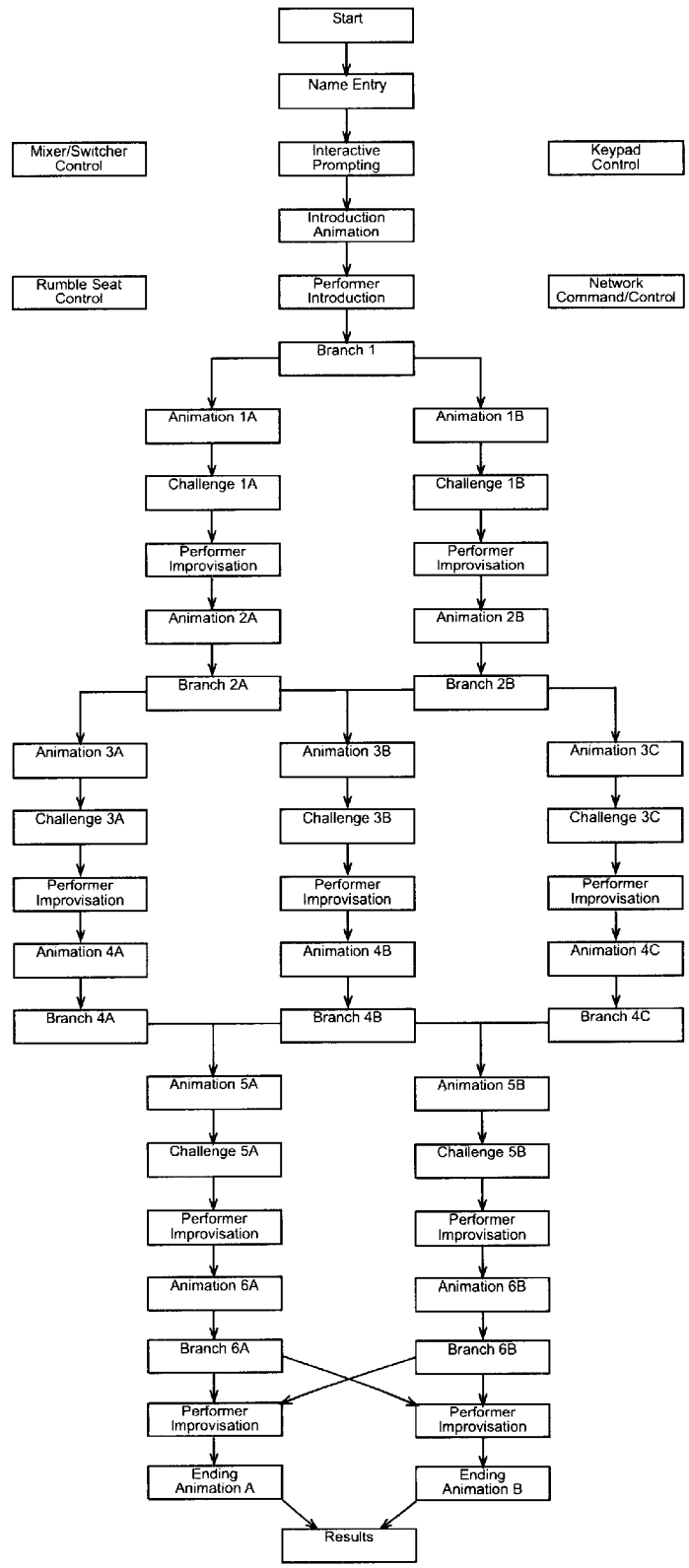
FIG. 8 is a software flow diagram according to the present invention.

The software for virtual reality performance theater system 100 is illustrated and generally indicated as software flow diagram 200 as shown in FIG. 8. The VRPT software system is a combination of low level and high level software programming code and multimedia scripting. The highest level show commands are created using Macromedia Authorware and incorporating the entire array of Authorware commands and function icons. At the highest level, the show programming residing on the control computer, (as previously described in connection with FIG. 7), starts with the entry of participant's names from the registration computer, and the Software reads those names and incorporates them as variables to be used during the show. The Software waits during which time the performer(s) is prompting the participants to speak and divulge information about themselves, as well as allowing the individual participants to become familiar with the equipment and microphone capability. If the show uses teams, the players can begin to establish team identity.

At a cue from the performer(s), the program proceeds in a series of animation clips (with the performer(s) both shown as an overlay and not shown), branches, challenges, improvisational segments, scripted segments, score reviews, decision points, player or team actions, etc. The Software on cue from the performer(s), plays video, audio, shows graphics, reads player input devices, performs calculations, controls hardware devices, communicates with the other computers in the network, and performs other functions. Authorware multimedia applications run simultaneously on other network computers (any of the multiple Secondary Computers including the Intensor Chair Computer) to provide additional functionality and cause the final show (delivered to every participant) to operate more smoothly and seamlessly.

Specific functional programs operate in connection with the Authorware applications and are written in C++ language. The functional programs communicate with the main Authorware program Software and perform functions such as: controlling the keypads and communicating participant keypresses to the Software, controlling the audio and signals delivered to the participant Rumble Seats, delivering commands and monitoring status of the hardware components such as the audio/video mixer and video switcher, and other functions. The control computer and all other computers communicate via TCP/IP network protocols and by sharing hard drives and text files and other types of files.

The Software system according to the present invention may easily be created using many other types of multimedia authoring packages besides Authorware which are currently or will be in the future available from publishers for the PC, Macintosh, or other types of computer systems, or it could be written in lower-level programming languages such as C++ or Java. The underlying control programs and device drivers could be written in many different types of programming languages besides C++ and result in equal performance and functionality. The network communication functions could be accomplished by many other protocols or means which may currently exist or exist in the future.

Figure 9:
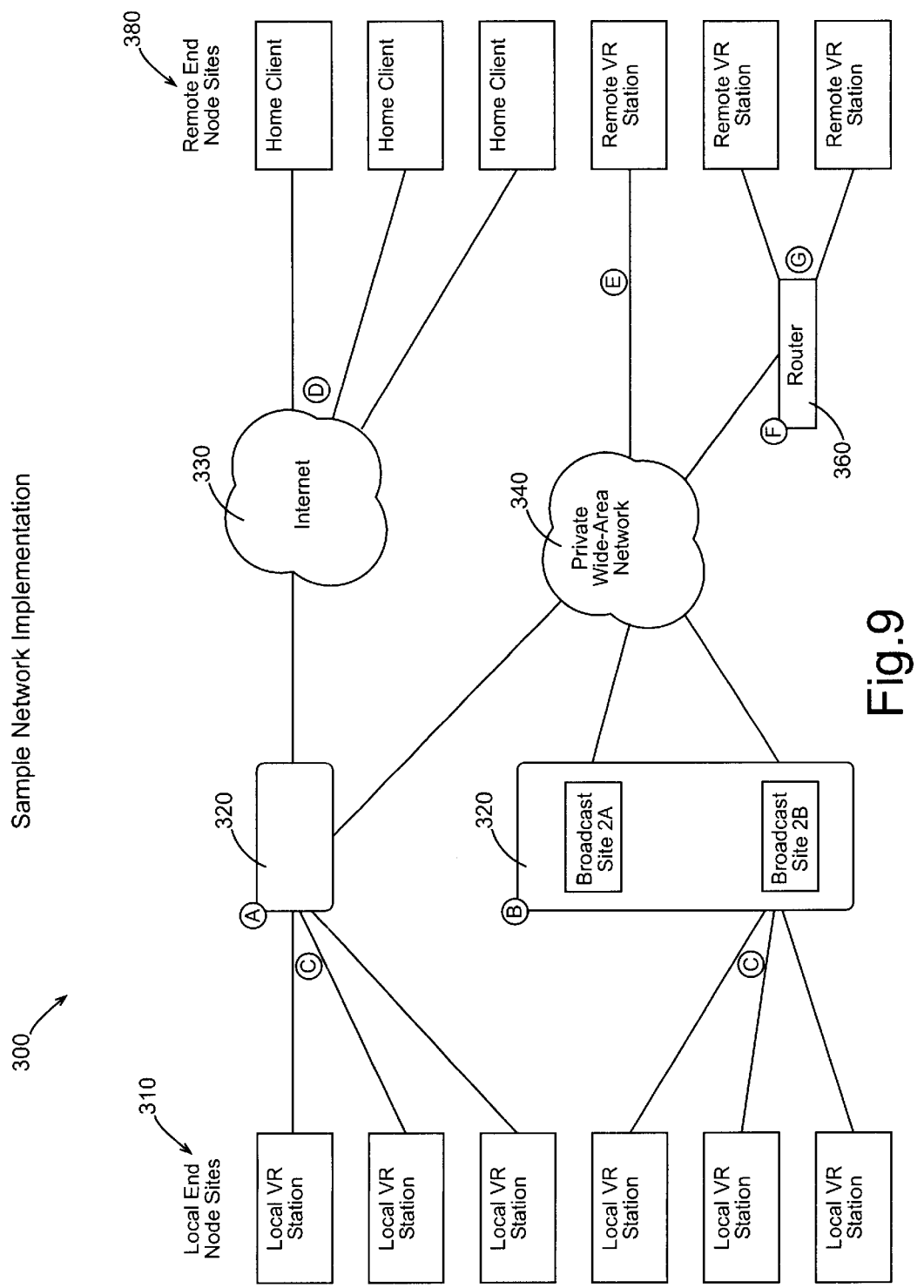
FIG. 9 is a network diagram according to the present invention.

Network 104, as depicted in FIG. 7, is more fully illustrated in FIG. 9 and is generally indicated as network implementation diagram 300. The network generally includes local end node sites 310, broadcast stations 320, Internet 330, private wide-area network 340, router 360, and remote end note sites 380. Using the network, the Virtual Reality Performance Theater (VRPT) can be connected to and communicate with one or more geographically remote locations for the purpose of transferring data related to the immersive experience.

The VRPT network consists of two primary components, namely, broadcast stations 320 which host the immersive experience, and multiple remote end note sites 380 which allow participants to perceive and interact with broadcast stations 320 and live performers. Broadcast stations 320 and remote end node sites 380 are connected with additional network components that include Internet 330, private wide-area network 340, and router 360.

Broadcast stations 320 contain the necessary hardware and software to deliver the computer graphics, audio information, tactile feedback (haptics), and live performer audio and video content that create the VPRT experience. Each station is also capable of receiving input supplied by the participant or the plurality of participants, including but not limited to, data from input devices, audio from microphones, and video transmissions.

Multiple sites have the capability to be combined to form a single broadcast station. For example, multiple server systems could be established in different locations for redundancy or to create a more complex experience, therefore enabling a greater number of participants and/or greater processing across the network.

While each broadcast station may have the capability of supporting live performances on a local network, it is also possible that one or more performers could be located at one or several remote broadcast sites 320 that are geographically removed from the participants. As shown with broadcast station 320B, a performer at broadcast site 2A would be an integral part of an experience hosted from broadcast station 320A or broadcast site 2B, or both.

Remote end node sites 380 include the equipment and network uplink that allow participants to perceive and interact with a immersive experience hosted by broadcast stations 320. From the flexibility of networking technologies, network topology can vary greatly from application to application. Topologies can range from a VR station site that is directly connected to a host server (Example C), to a remote kiosk (Examples E and G), or to a home computer or television "set top" box, such as a gaming system, capable of interactive feedback (Example D). Any one of the examples will include, at a minimum, feedback systems that relay data from input devices and/or voice communications, and may also include, but not be limited to, such equipment as a head mounted display, force feedback output, and/or rumble seats as previously described above in connection with FIG. 3.

Three primary categories of network connections are implemented to provide the minimum performance level which allows real-time transmission of live audio and video information to remote end note sites 380 and the feedback of data input and audio responses. The three categories include:

1). Local Area Networks (LANS): LANs provide an economical approach wherein network technologies such as Ethernet can be used to connect remote end note sites 380 to broadcast stations 320.

2). Private Networks (PNs): PNs consisting of dedicated circuits from one or more carriers are also implemented. PN links can also use telco circuits as the physical medium for communication, including but not limited to xDSL, T1, DS3, or OC3 level links. In addition, the data using these types of circuits may travel across such traditional communication infrastructure systems as SONET, satellite, microwave, and others.

3). Public Networks (the Internet): The Internet is employed as the most cost-effective connection, particularly in the case of residential remote end node participants. Further, data transport across the Internet may also be used in place of the PN as discussed above. Typical links into the Internet include analog modems, cable modems, T1, ISDN, and xDSL connections.

The plurality of computers and processing components in the network thus enable data, determined by interactions and scripting and spontaneous use of video cameras, to be projected as images to the vision devices worn by a plurality of spectators and also to be projected by monitors to the performers, so as to create and provide a software-controlled immersive virtual reality performance, even when the performers are at a site or sites remote from their audience. Similarly, audio signals are provided to the players at their seats and at their headphones. Through vision, sound intercommunication, sound projection, vibration projection and hand held input means, each spectator is enabled to view, and to a limited extent, interact with the virtual reality environment with live and/or pre-recorded performers.

Figure 10:
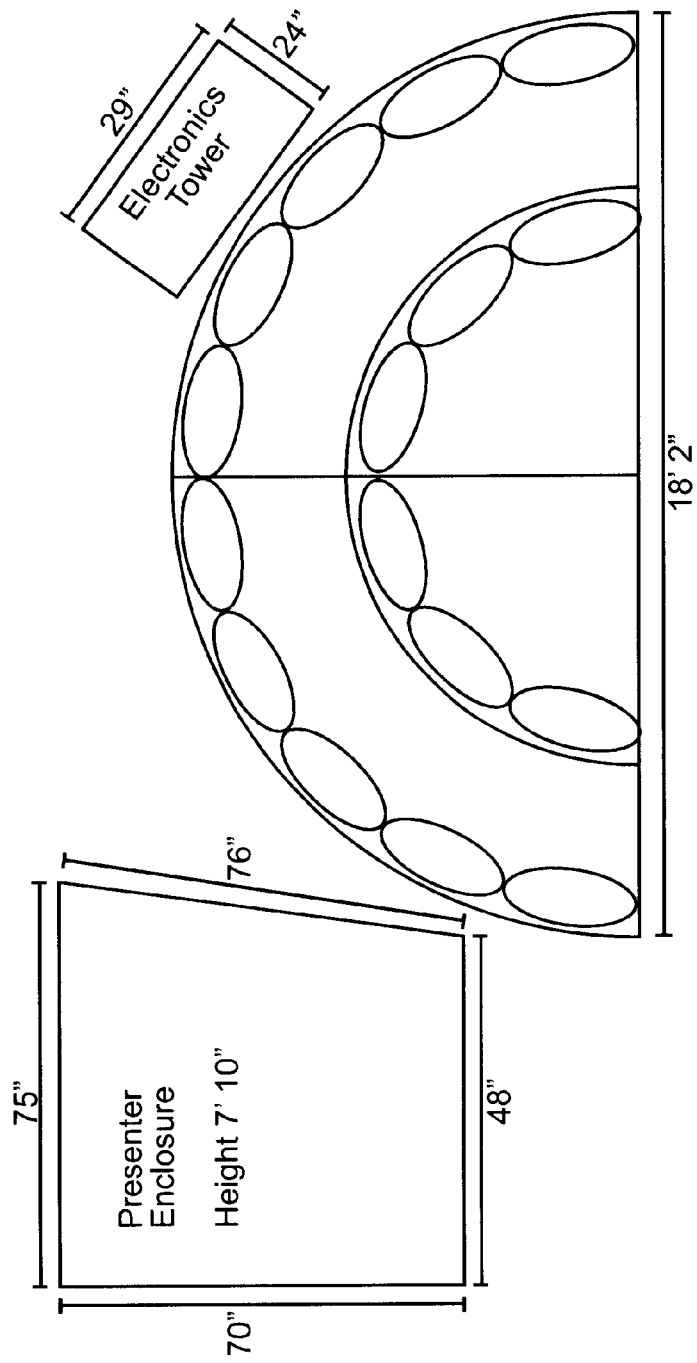
FIG. 10 is a top view of an alternate embodiment of the virtual reality performance theater system depicting a 16 seat theater.
Figure 11:
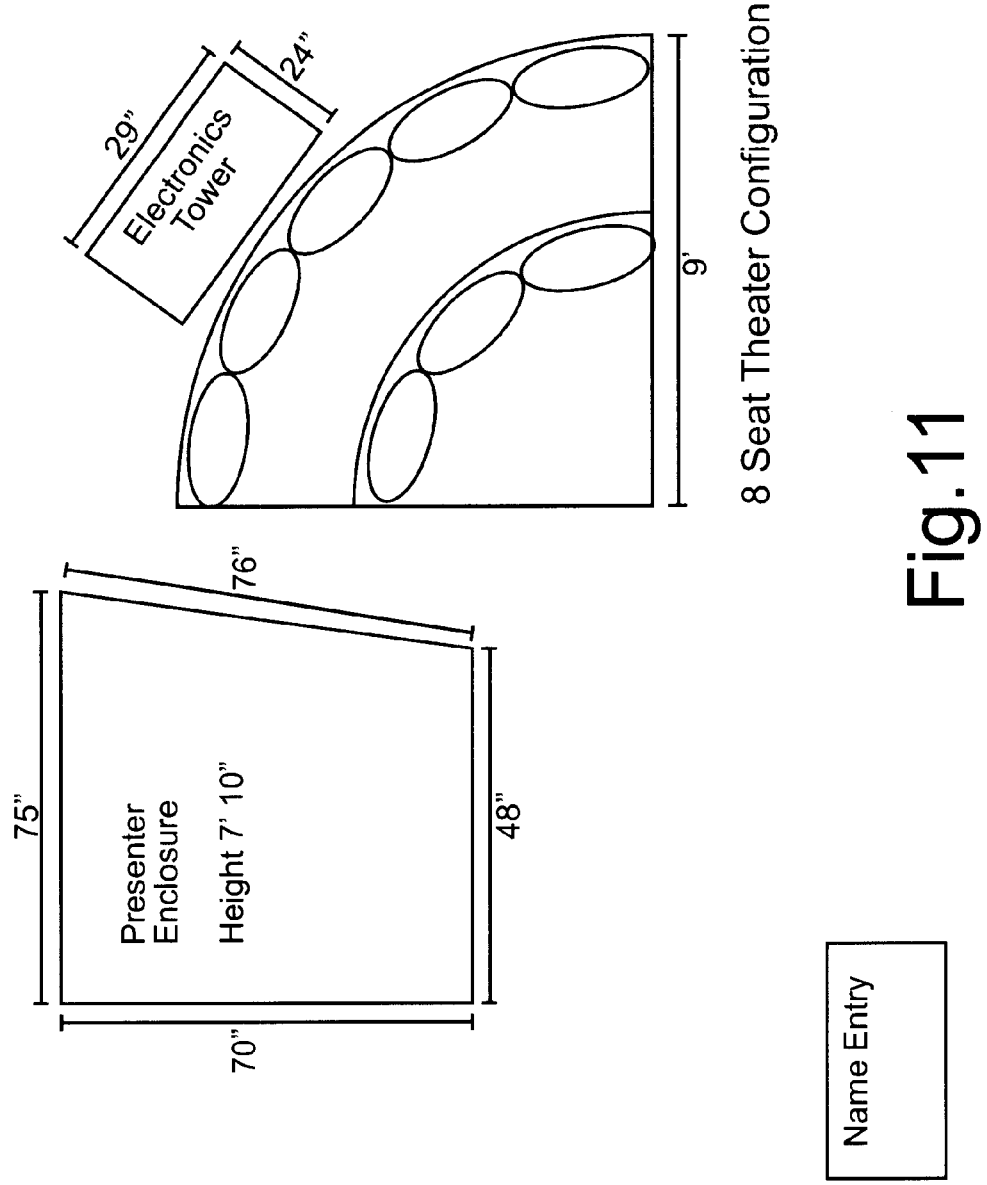
FIG. 11 is a top view of another alternate embodiment of the virtual reality performance theater system depicting an 8 seat theater.

Alternate embodiments of the VRPT are shown as a 16-seat theater as shown in FIG. 10, or an 8-seat theater as shown in FIG. 11. VRPTs can also be customized depending upon the particular needs of the audience and depending upon the entertainment and/or educational nature of the performance. The number of seats could range from only one to dozens or even hundreds of seats depending upon the application. The system of the VRPT is modularly designed so as to accommodate a customized number of participants and associated input and output devices. As shown in FIGS. 10 and 11, VRPT generally includes participant seating, a presenter enclosure, a control station, and the computer/electrical system, all of which have been described more fully herein above.

In accordance with the system features described above and shown in greater detail in FIG. 7, the system provides a method of projecting the performers into the virtual reality environment in such a way that the entertainment programming delivered is spontaneous and adaptive to current actions of the performers and participants.

From the foregoing description it is seen that system provides innovative immersive virtual reality (VR) technology integration that delivers an interactive entertainment and/or educational experience to a group of participants. As an example, the system can in a gaming or entertainment type of use provide a show length ranging from few minutes upward to many minutes, and can be dependent on the number of participants which may be from a player or two players to many, such as hundreds or conceivably more players.

It will be appreciated that system component features herein described permit live performances using interfacing technology such as cameras/electro/mechanical/magnetic apparatus for capturing performer attributes, voice and movement, thus permitting the achievement of a virtual reality environment in which the performance takes place. In the system of the invention, a group of participants can interact with the performers inside the virtual reality environment and can enjoy a sense of "immersion" within the environment so created.

Live and/or pre-recorded performers and/or participants can by the system be represented inside the virtual reality environment as avatars, i.e., animated characters, having humanoid or other attributes. The performers and participants are furthermore integrated with the graphics and immersive environment to facilitate interaction and a more enjoyable virtual reality experience. The performers and participants can do so even though the performers are at a location as remote from the participants as available communication means permit. Hence, the system makes possible performer avatar, participant avatars, and other virtual reality objects of other fanciful characters which may have realistic preprogrammed motion and special visual effects.

In their participation in the system, the players interact by any one or more of voice, electronic voice intercommunication, voice recognition, handheld devices, force feedback devices, motion devices, body motion, keyboard input, skin resistance, joystick controllers, and steering wheels.

The system offers the capability for acquisition of feedback from participants from voting, polling, questions, etc., and the system can also enable monitoring of the viewpoints of participants for current and post-analysis of their interested view targets. Artificial intelligence monitors and response to participant feedback are also possible additions to the system.

The system enables the realization of a large video display for an audience, as the display can be software augmented. Because the system architecture is modular, it can be used for delivery of these performances to audiences of almost any size, including audiences distributed among many sites. Voice processing may be used to enhance the performers' proxy for virtual characters.

In operation, the system hardware, software and integration provide in a technologically innovative way the following functions:

1. Multiple performers and participants in a virtual reality environment.
2. Performer voice and visual information is broadcast to multiple simultaneous computers.
3. Significant interaction and integration of performers and computer graphics is achieved through video mixing and chromakey technology.
4. A backstage operator and show performer may interface to broadcast commands to the network of the system.
5. Performers may interact together and/or with participants in a scripted, improvisational, ad-lib, or spontaneous fashion.
6. A unique technologically-enhanced process is achieved for progression of the show along a pre-determined script, with allowances for spontaneous deviations from the script because of participant and performer actions.
7. The system has the ability to blend signals from many different live cameras, video sources such as VCRs, laserdisk players, computers, satellite feeds, Internet feeds, etc. and multiple audio signals from microphones and/or live or pre-recorded broadcast or other types of signals into an entertainment and multimedia format.

8. Innovative communications architecture allows for almost unlimited scale-up of the number of participants, both audience and performers, and both categories of participants distributed among a plurality of sites, each remote one from the other.
9. Stereoscopic visual graphics are achieved.
10. Unique and innovative methods are utilizable in the system for creating visual special effects by preprogramming motion paths, mesh transformations, and computer animations and then delivering them in real-time to participants.
11. Computer-controlled microphone switching is made possible.
12. Artificial intelligence can be used for virtual camera shows to the audience.

Illustrative of merely some of the many ways in which the new system is intended to be used for interactivity include, but are not limited to, the following:
1. Specific method of attracting persons to trade show booths.
2. Draw audience to special marketing events to entertain and/or inform.
3. Unique medium for multi-site corporate promotional tours.
4. Enhanced and more effective means of communicating ideas and concepts to a group.
5. Unique method of entertaining audiences at public entertainment venues.
6. Effective means for demonstrating a new idea or product to a group of people and/or to monitor their reaction by a variety of feedback mechanisms.
7. Alternative method of bringing standup or improvisational comedy to an audience via technology.
8. Alternative method of delivering performing arts to audiences.
9. Unique method of effectively delivering historical information to an audience.
10. Novel method of delivering educational and training materials with increased memory recall and learning efficiency.
11. Unique way to draw and entertain public to special occasions and holidays.
12. Effective replacement or augmentation for movie theaters for entertainment or pre-show promotions.
13. The performance of dialogue and drama using the immersive virtual reality simulation medium.
14. Unique way to facilitate games of chance such as bingo and poker.

In view of the foregoing description of the present invention and practical embodiments it will be seen that the several objects of the invention are achieved and other advantages are attained. The embodiments and examples were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

The breadth and scope of the present invention should not be limited by any of the above-described exemplary embodiments, but should be defined only in accordance with claims of the application and their equivalents.

What is claimed is:

1. A system which interacts with participants and performers, said system comprising:

an immersive virtual reality environment;

at least one performer input device, in electronic communication with said immersive virtual reality environment;

at least one participant input device in electronic communication with said immersive virtual reality environment;

at least one performer output device in electronic communication with said immersive virtual reality environment;

at least one participant output device in electronic communication with said immersive virtual reality environment;

wherein at least one live performer interacts with at least one participant and said immersive virtual reality environment;

wherein said immersive virtual reality environment includes a live or prerecorded video image of said at least one live performer and audio communication between said at least one live performer and said at least one participant, or between said at least one participant and said at least one live performer, or both;

wherein said at least one participant interacts with said at least one live performer and said immersive virtual reality environment, thereby resulting in an experience which is in part controlled by said at least one participant and said at least one participant input device.

2. The system of claim 1 wherein said immersive virtual reality environment further comprises:

at least one processing device;

system data;

output data; and a network, said network connecting said processing device, said at least one performer input device and said at least one performer output device, and said at least one participant input device and said at least one participant output devices in electronic communication, thereby transmitting said system data and said output data to said at least one live performer and said at least one participant.

3. The system of claim 2 wherein said at least on participant output device further comprising:

at least one seat;

at least one virtual reality display; and at least one participant audio device;

said at least one participant input device further comprising:

at least one hand-held keypad; and at least one participant microphone;

said at least one performer output device further comprising:

at least one live video image of the participant; and at least one speaker, said speaker transmitting said at least one participant microphone input to said at least one live performer;

said performer input means further comprising:

at least one live video image of said at least one live performer; and at least one performer microphone;

wherein said at least one participant views said output data from said immersive virtual reality environment and said live video image of said at least one live performer through said at least one virtual reality display and provides feedback to said immersive virtual reality environment through said at least one hand-held keypad and said at least one participant microphone.

4. The system of claim 3 wherein said output data further comprises:

graphical images; and audio data.

5. The system of claim 4 wherein said seat further comprises:

a rumble seat, said rumble seat providing sound and movement to said at least one participant.

6. The system of claim 5 wherein said processing device further comprises:

at least one control computer;

at least one audio processor;

at least one audio switcher;

at least one video processor; and at least one video switcher;

wherein said at least one control computer processes and distributes data from said at least one performer input device and said at least one performer output device and said at least one participant input device and at least one participant output device;

said at least one audio processor processes said at least one participant microphone input, said at least one performer microphone input, and said audio data in accordance with said system data of said at least one control computer; said at least one audio switcher switches at least one participant microphone input, at least one performer microphone input, and said audio data in accordance with said system data of said at least one control computer; said video processor processes said live video image of the participant, said live video image of the performer, and said graphical images in accordance with said system data of said at least one control computer; and said video switcher switches said live video image of said at least one live performer with said graphical data in accordance with said system data of said at least one control computer; thereby selectively providing said graphical images, said audio data, and said live video image of said at least one live performer in said at least one virtual reality display, and selectively providing said at least one participant microphone input, said at least one performer microphone input, and said audio data to said at least one participant audio output device.

7. The system of claim 6, said immersive virtual reality environment further comprising:

a control station;

said control computer further comprising:

a registration computer;

said system data further comprising:

participant information;

wherein said at least one participant registers participant information into said registration computer for interactive use in said immersive virtual reality environment.

8. A system which interacts with participants and performers, said system comprising:

an immersive virtual reality environment, said immersive virtual reality environment further comprising:

at least one processing device;

system data;

output data; and a network;

at least one performer input device in electronic communication with said immersive virtual reality environment;

at least one participant input device in electronic communication with said immersive virtual reality environment;

at least one performer output device in electronic communication with said immersive virtual reality environment;

at least one participant output device in electronic communication with said immersive virtual reality environment;

wherein at least one live performer interacts with at least one participant and said immersive virtual reality environment, and said immersive virtual reality environment includes a live or prerecorded video image of the performer and audio communication between said at least one live performer and said at least one participant, or between said at least one participant and said at least one live performer, or both;

wherein said at least one participant interacts with said at least one live performer and said immersive virtual reality environment, thereby resulting in an experience which is in part controlled by said at least one participant and said at least one participant input device;

said network connecting said processing device, said at least one performer input device and said at least one performer output device, and said at least one participant input device and said at least one participant output device in electronic communication, thereby transmitting said system data and said output data to said at least one live performer and said at least one participant, and said network connecting said immersive virtual reality environment and said at least one participant input device and said at least one participant output device across the Internet.

9. A method of providing interactive communications between participants and performers comprising the steps of:

(a) providing an immersive virtual reality environment (b) providing at least one performer input device in electronic communication with said immersive virtual reality environment;

(c) providing at least one participant input device in electronic communication with said immersive virtual reality environment;

(d) providing at least one performer output device in electronic communication with said immersive virtual reality environment;

(e) providing at least one participant output device in electronic communication with said immersive virtual reality environment;

(f) having at least one live performer interact with at least one participant and said immersive virtual reality environment, by including with said virtual reality environment a live or prerecorded video image of said at least one live performer and audio communication between said at least one live performer and said at least one participant, or between said at least one participant and said at least one live performer, or both;

(g) having at least one participant interact with at least one such live performer and said immersive virtual reality environment, thereby resulting in an experience which is in part controlled by said at least one participant and said at least one participant input device.

\* \* \* \* \*